United States Patent [19]

Pera

[11] Patent Number: 4,936,255
[45] Date of Patent: Jun. 26, 1990

[54] MILKING MACHINE

[75] Inventor: Anne Pera, Emmeloord, Netherlands

[73] Assignee: Gascoigne-Melotte B.V., Emmeloord, Netherlands

[21] Appl. No.: 247,961

[22] Filed: Sep. 22, 1988

[30] Foreign Application Priority Data

Sep. 24, 1987 [NL] Netherlands .......................... 8702285

[51] Int. Cl.⁵ ............................................. A01J 5/04
[52] U.S. Cl. .................................. 119/14.08; 119/14.1; 119/14.18
[58] Field of Search ................. 119/14.08, 14.1, 14.11, 119/14.18

[56] References Cited

U.S. PATENT DOCUMENTS

| | | | |
|---|---|---|---|
| 3,624,739 | 11/1971 | Thomas | 119/14.1 |
| 3,713,423 | 1/1973 | Sparr, Sr. | 119/158 X |
| 3,861,355 | 1/1975 | Johnson et al. | 119/14.08 |
| 4,010,714 | 3/1977 | Notsuki et al. | 119/14.03 |
| 4,685,422 | 8/1987 | Middel et al. | 119/14.08 X |

FOREIGN PATENT DOCUMENTS

| | | |
|---|---|---|
| 194729 | 9/1986 | European Pat. Off. . |
| 213660 | 3/1987 | European Pat. Off. . |
| 229682 | 7/1987 | European Pat. Off. . |
| 2408300 | 6/1979 | France . |
| 2595197 | 9/1987 | France . |
| 8502973 | 7/1985 | PCT Int'l Appl. . |

Primary Examiner—Robert P. Swiatek
Attorney, Agent, or Firm—Ingersoll Buchanan

[57] ABSTRACT

In a machine for milking cattle the teat cups are supported in a structure (2,3) movable horizontally towards and away from the animal to be milked, the teat cups being suspended by pivoting arms (15) so as to be swingable to move between the hind legs of the animal between a milking position and a retracted position. The arms 15 have horizontal pivoting axes at an angle to the longitudinal direction of the animal. This permits the teat cups to move between these two positions at a horizontal angle to this longitudinal direction so that, in the retracted position, there is a space in the milking parlor to the side of the teat cups. This space can be used for other purposes, e.g. for taking up a cleaning device for the udder and teats.

19 Claims, 3 Drawing Sheets

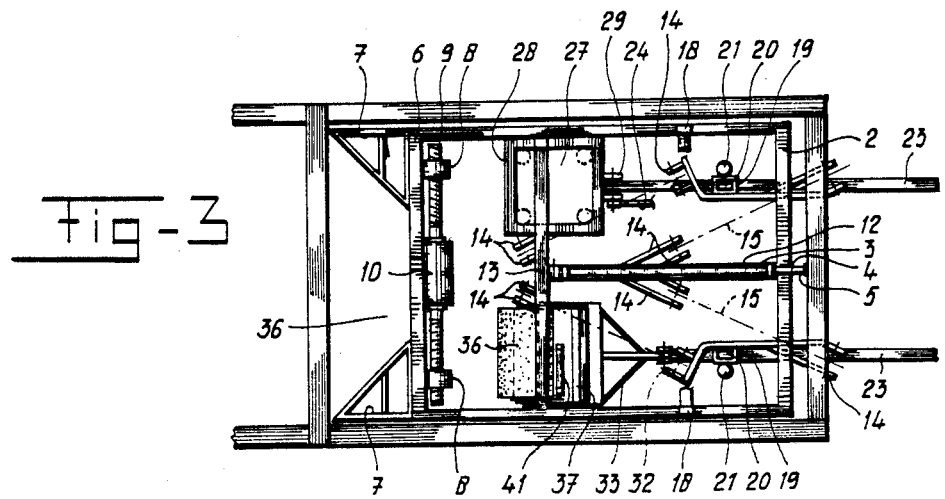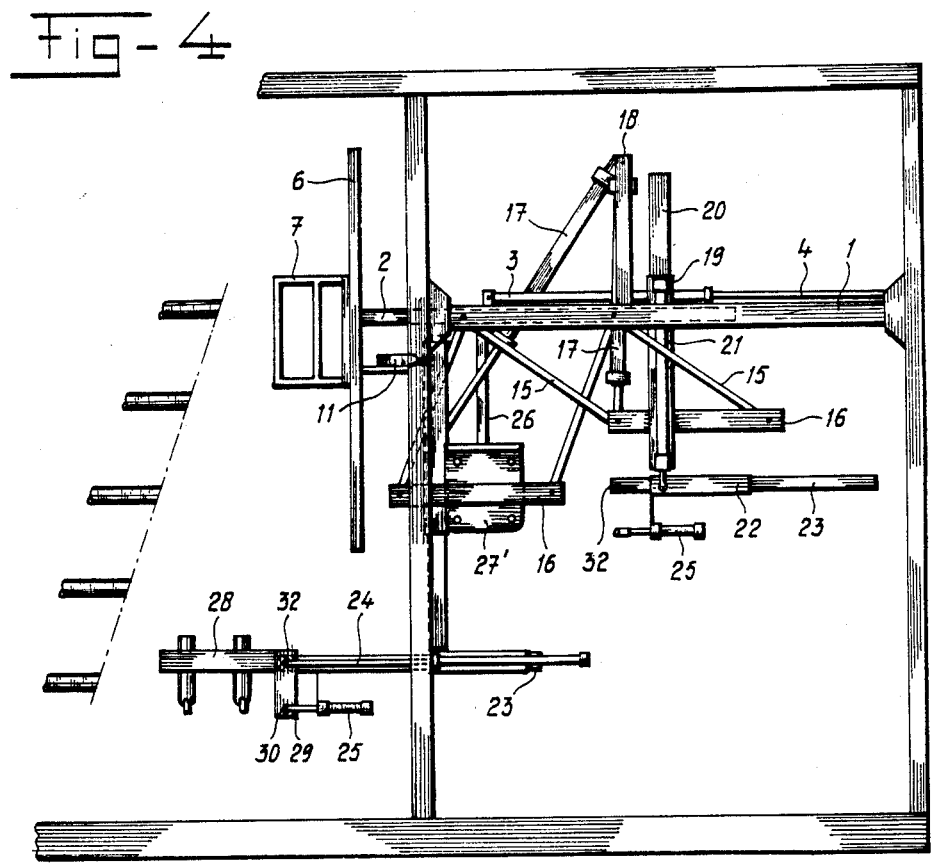

MILKING MACHINE

The invention relates to a milking machine which has, supported in the surrounding structure, means for carrying the milking unit with teat cups, for taking it under an animal to be milked for fitting of the teat cups, and for removing it therefrom, in such a way that the milking unit is moved through under the hind legs of the animal to be milked between said fitted position and a retracted position.

Such milking machines are known in all kinds of forms, for example from Dutch Patent Application 83.04498 and the corresponding International Patent Application PCT/NL 84/00044, Publication No. WO 85/02973.

The milking unit can in those cases move through between the hind legs in the vertical longitudinal plane of the animal to be milked and in the retracted position lies straight and centred behind it in the machine.

The object is now to improve the design of such a machine in such a way that in a simple manner space is gained and can be usefully employed particularly in the further automation of the milking process, for example to take an also fully or largely automatically fitted and removed cleaning unit for udder and teats of the animal to be milked.

For this purpose, a machine of the type mentioned in the introduction is characterized in that said means for carrying and thus moving the milking unit have guide means to make the milking unit also perform a lateral movement when it is being drawn backwards to said retracted position relative to the vertical centre lengthwise plane of the animal to be milked, thus of the milking pen or the like for accommodation thereof during milking, so that in the retracted position it comes to rest at one side of said centre lengthwise plane.

The milking unit thereby leaves a space free in the fixed structure behind the animal, which space can be put to use as stated above.

The invention can, of course, be carried out in many different ways. For example, the milking unit can be placed on a carriage on the floor, and said carriage can move along a slanting travelling or guide track, for example made up of straight parts with a bend to the side between them.

However, the embodiment which is most preferable according to the invention is one in which said retracting movement is produced by the milking unit being suspended from swivelling arms which swing about roughly horizontal pins, said pins forming an oblique angle with said vertical centre lengthwise plane. This gives a construction which is simple to carry out, in which—as will be described below—it is still easy to prevent the milking unit from touching one of the hind legs of the animal during its movement.

If the space behind the animal at the side of the thus eccentrically retracted milking unit is used for the accommodation of a cleaning unit for udder and teats, it is also preferably according to the invention carried movably by said fixed structure so that it is moved between said retracted position and a working position near the udder. For this also, a carriage on the floor can be used, but this cleaning device is also preferably suspended from inclined swivelling arms, like the milking unit, but then with the obliqueness of the approximately horizontal swivel pins in the opposite direction to that of the swivel pins for the milking unit.

The invention also relates to an advantageous further development of these principles, as will be described further with reference to an embodiment shown in the drawings.

The cleaning device used can be a single brush or a set of brushes which rotate about an approximately vertical axis, while at the same time a washing liquid such as tepid Water is sprayed on udder and teats, or there can be dry cleaning. Such rotating brushes are known for this purpose, for example from U.S. Patent Specification No. 2,952,860. They can also have a drain for collected used liquid. Known cleaning devices without brush can also be used, for example having a holder with jet nozzles for the cleaning liquid and a collecting tank around and under the udder, as known per se. A preferred embodiment, however, has a rotating brush with a horizontal axis, as will be described in detail below.

In the drawings:

FIG. 3 is a top view of a machine according to the invention in a preferred embodiment, partially schematic;

FIG. 4 is the same side view as FIG. 1, but with the milking unit in the position under the udder of an animal to be milked.

Figure 1:
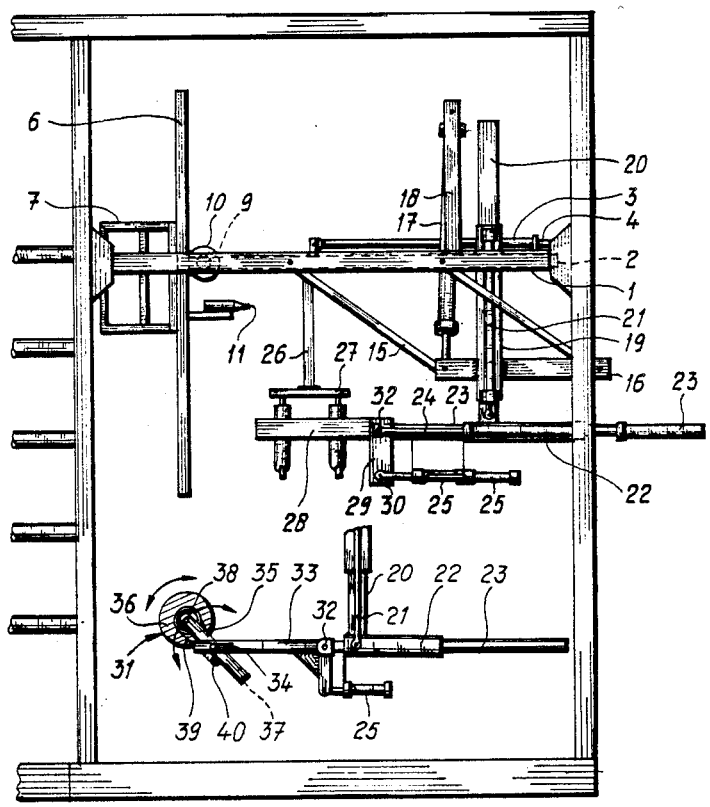
FIG. 1 is a side view.

Only the rear part of a milking pen is shown in the figures. It is extended to the left by the usual frame parts, gates for closing and opening to allow an animal such as a cow to enter and leave the pen, a feed box etc., said parts not having any direct connection with the invention.

Supported in the frame, on two side bars 1 behind the milking area, is a carriage 2 which can be moved to and fro (to left and right in FIGS. 1, 3 and 4 and forwards and backwards in FIG. 2) with a pneumatic cylinder 3 on the carriage, of which the free end of the piston rod 4 is fixed at 5 in the fixed frame. The carriage bears an upright front wall 6 which is designed as an open framework, and which is thus moved until it comes against the rear face of the seat bones of a cow to be milked, and which can have one or more sensors to establish that contact is made with the animal. Some pressure is then maintained in cylinder 3 to hold the carriage with said front wall 6 against the animal, even if it should move forward or back in the lengthwise direction.

Once an animal has taken its place in the pen, a barrier in the floor is preferably raised, in a manner known per se, for example comprising two plates which pivot about longitudinal pins, in order to ensure that the animal remains standing with its rear legs well spread apart.

Two flank confining partitions 7 are now moved inwards towards each other from the position of FIG. 3 until they touch and confine the animal under sufficient pressure, something which can be checked by sensors. Said partitions 7 can have guides (not shown) for transversely moving the partitions 7 along wall 6 into and out of contact with the animal. For example, rollers provided on partitions 7 may be guided by a horizontal front bar of the carriage 2. A nut 8 provided on each partition 7 engages either the left hand or right hand thereof of lead screw 9. Motor 10 rotates lead screw 9 which in turn moves partitions 7 towards or away from each other.

The sensors on the parts 6 and 7 are incorporated in the process control system in such a way that the movements to be described further below for fitting the milking unit and the cleaning unit can be made only if said sensors establish the presence of an animal to be milked.

A stop 11 with microswitch for observing contact is provided in the centre of said wall 6.

Slanting brackets 14 forming horizontal hinge axes which slant relative to the direction of movement of the carriage are disposed on a centre bar 12 and an intermediate bar 13 of the carriage 2. In FIG. 3 these axes are shown by dashed lines, and the swivelling arms suspended from the axes are not shown. The angles formed by said axes with said direction of movement are equal but opposite, in the sense that the parallel axes on one side of bar 12 run in the opposite direction to those on the other side, as shown.

A swivelling arm 15 is suspended from each bracket 14, and two parallel swivelling arms are always hingedly connected at the bottom to a bar 16 which is and remains horizontal during swivelling of the arms. Disposed on each bar 16 is the free end of the piston rod of a pneumatic cylinder 17, which is fixed on the carriage with its top end pivoting on an upright 18. Only one of these cylinders is shown in FIG. 1, and they are left out in FIG. 3.

Figure 2:
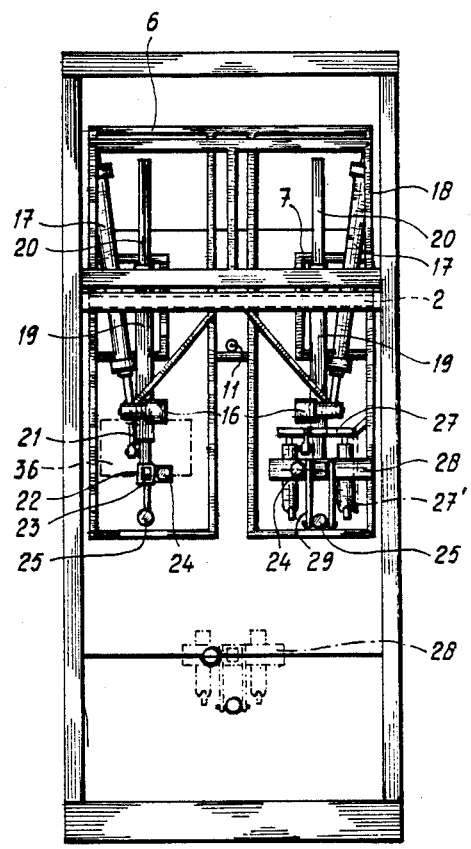
FIG. 2 is a rear view.

Each horizontal bar 16 has a vertical sleeve 19, for example square, in which a tube 20, therefore also square, is guided in sliding fashion. A vertical pneumatic cylinder 21, left out in FIG. 2, is disposed near or in each of these parts on sleeve 19. The tube 20 has at the bottom firmly connected thereto a horizontal sleeve 22 which is acted upon by the piston rod of cylinder 21. This sleeve contains a sliding tube 23 of the same cross section, for example square, and disposed in or along this sleeve and tube is a pneumatic cylinder 24 on the sleeve, with the end of its piston rod on said tube. The tube 23 carries a small pneumatic cylinder 25 on a downward pointing arm. Cylinder 24 is omitted in the lower part of FIG. 1, in FIG. 3 and in the central and right hand part of FIG. 4 and so are several other parts in part of the Figures for the sake of clarity.

The carriage 2 also has on one side a downward pointing arm 26, which has fitted on the bottom a cleaning device for cleaning the inside of the teat cup of the milking unit, formed here by a horizontal plate 27 which in a manner known per se has four nozzles with a number of spray apertures for cleaning liquid and a connection for cleaning liquid which is not shown. With a small cylinder (not shown), this plate can be flapped down to the position 27' shown in FIG. 4, which is shown by dashed lines in FIG. 2, in which the nozzles are just short of projecting beyond the frame.

One of the mechanisms described carries a milking unit 28, which is shown only schematically here, and which has four teat cups which can be moved in a manner known per se in two directions perpendicular to each other to adjust to the position of the teats of the animal to be milked, which can be determined by sensing elements and/or can be stored in a computer memory which on the basis of a recognition system for identifying a particular animal adjusts the position of the teat cups to the position of the teats of said animal known to the memory.

All this is known in principle and does not constitute part of the present invention, so that it will not be detailed further here. This milking unit has a carrier 29, which is hingedly engaged at 32 by the tube 23. Cylinder 24 may also engage the pivot pin at 32 as shown. The piston rod of the small cylinder 25 engages with carrier 29 at a distance below pivot pin 32 at 30.

Figure 5:
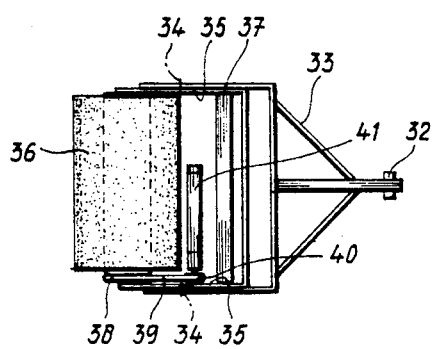
FIG. 5 is a view from above of the cleaning device for the udder and teats on a larger scale.

The other one of the mechanisms described carries a cleaning device, which can be in all kinds of forms, and is shown here in a preferred embodiment having a brush 31 rotating about a horizontal transverse axis, and if desired with connections not shown for feeding in a cleaning liquid and spraying it against the udder. It can be seen from the drawings and in particular from FIGS. 1, 3 and 5, that the brush 31 is supported on an axis in a fork 35, which is pivotably supported at 34 in the supporting frame 33, which is suspended from pin 32 and angularly adjustable by the small cylinder 25 of this mechanism.

The fork 35 carries a counterweight 37 tending to tilt fork 35 so as to move brush 31 upwardly, which movement may be limited by a suitable cam or abutment not shown on frame 33. In the axis of rotation of the brush there is a driven wheel 38, e.g. toothed, to be driven by a belt or the like, such as a toothed belt 39, which is driven by a belt pinion 40, driven by motor 41, which may be a reversible air motor. Frame 33 has a downwardly directed arm similar to carrier 29 for the milking unit 28 as described and is connected pivotally to its pivot pin 32 to be carried thereby and, in a lower point, to the piston rod of its cylinder 25.

For a good understanding, it is pointed out that the milking unit 28 in FIGS. 1, 2 and 3 is in the most retracted position, and in FIG. 4 is in the position in which it need only be moved upwards to connect to the udder. That position is shown by dashed lines in FIG. 2.

The brush 31 is shown in top view in the retracted position in FIG. 3. In FIG. 1 the brush is shown in the lowest position, for the sake of clarity, away from the major part of its movement mechanism, which is omitted here for sake of clarity. Only the set of swivelling arms 15, one bar 16, one tube 19 etc. for the milking unit 28 are shown here. The brush is left out entirely in FIG. 4. It is on the pin 32, which is shown here at the right.

As will be described below, it will have to be possible to fix part of the pneumatic cylinders accurately in certain controlled positions, something which can take place in a known manner by making them double-acting and controlling the pressures on either side by valves in such a way that the forces on the piston are balanced.

From the situation with fully backwards retracted positions of the carriage, milking unit and brush, as shown in FIG. 3, corresponding to the position of the milking unit in FIGS. 1 and 2 and of the brush mechanism in FIG. 4, one now proceeds as follows: When the milking unit 28 is to be fitted, then the carriage 2 is first moved forwards in the manner described until the wall 6 makes contact with the animal, following which it is laterally confined by the partitions 7. The sleeve 20 is now moved downwards from its carrier mechanism with its cylinder 21.

The teat cups thus come free from the nozzles of the cleaning device 26, 27 reaching into them, the carrier plate 27 of said device then being lowered to position 27', in order to ensure that the swivelling arms 15 are not impeded in their downward swinging movement. The piston rod of cylinder 17 of the milking unit is now extended, preferably to its maximum length, so that the swivelling arms 15 swing from the position of FIG. 1 to the position shown for the milking unit in FIG. 4, shown by dashed lines in FIG. 2. At that maximum length the vertical sleeve 19 touches the stop 11, so that the microswitch therein gives a control when this position is reached. Through the slanting swivel axis of the arms 15 the milking unit is thus moved precisely to the centre of the pen. Cylinder 24 is then extended to move tube 23 forwards, so that the milking unit goes approximately into the position shown in FIG. 4, which is the correct horizontal position of the milking unit relative to the udder, the horizontal position of which relative to the seat bones of the animal is known from a computer memory. With cylinder 25 the milking unit is taken into the correct position about the horizontal cross pin 32 of its carrier, adjusted to the position desired for a particular animal, and the teat cups are now taken to the correct horizontal distances between them, which is known per se and is not relevant here, and the vertical cylinder 21 of the milking unit is then shortened, so that the milking unit is fitted. With a quick-venting valve on cylinder 21 a constant upward force is maintained on the milking unit, regardless of height changes of the udder during milking. The milking can be carried out further in the known manner, adapted to what is recognized for an individual animal as regards time, differences between the teats, not milking an infected teat etc.

After milking, the reverse movements take place, and after the swivelling arms 15 of the milking unit have been swung back to the position shown in FIG. 1, the carrier plate 27 of the cleaning device for the teat cups is flapped back into the horizontal position, so that shortening of cylinder 21 makes the milking unit grip round the nozzles of said cleaning device, following which the cleaning can begin.

If an udder has to be cleaned before or after milking, the brush 31 is moved, while the milking unit is retracted, in the same way in principle until it is below the udder, the stop 11 establishing contact again with the vertical sleeve 19 of the carrier mechanism of the brush. Here again the identification system and computer memory serve to take the brush to the correct place and the correct angle relative to the horizontal plane under the udder. The mechanism described can move it from the position of FIGS. 2 and 3 through the position of FIG. 1 and then further forward to about the position, shown for the milking unit in FIG. 4. The brush 31 is rotated and simultaneously moved forwards and bachwards below the udder by its cylinder 24 or by separate means not shown. The brush remains in light contact with the udder and with the teats by counterweight 37. Preferably, the brush is rotated in opposite directions so that, when it moves forward along the udder, it rotates with the hairs or bristles on top forwardly and that, when it moves backwards, the hairs or bristles on top move backwardly. This may be obtained automatically by switching means not shown, changing the direction of rotation of the brush (i.e. of drive motor 41) when piston rod of cylinder 24 or separate reciprocating means reaches the end of its forward or backward stroke.

All positions to be controlled from a processor can work with distance measuring systems which are not described in any greater detail, for example with a row of LEDs on one of the horizontal and vertical parts, sleeves, tubes, cylinders or piston rods, and a photosensor working therewith on the part moving relative thereto, but other position-observing and indicating devices are also available for this purpose.

It will be clear that with the use of the invention a particularly compact and relatively simple construction is achieved, which makes it possible to store other requisites, if desired, to the side of the retracted milking unit.

I claim:

1. An apparatus for milking animals comprising a supporting structure surrounding the animal to be milked, a milking unit attached to said structure, teat cups provided on said milking unit, and means for carrying the milking unit under an animal to be milked for fitting of the teat cups and removing the milking unit therefrom, wherein the milking unit is moved through under the hind legs of the animal being milked from a retracted position to a fitted position, said carrying means comprising guide means which laterally move the milking unit when it is being drawn backwards to the retracted position relative to the vertical center lengthwise plane of the animal to be milked, so that in the retracted position it comes to rest at one side of the center lengthwise plane.

2. An apparatus according to claim 1 further comprising swivelling arms which swing about roughly horizontal axes, said axes forming an oblique angle with said vertical center lengthwise plane, retracting movement of the milking unit is produced by the milking unit being suspended from the swivelling arms.

3. Apparatus according to claim 2 further comprising a carriage which can travel or glide in the fixed structure behind the place of the animal to be milked in the center lengthwise plane thereof, wherein the swivelling arms are disposed so that they swivel about said oblique axes on the carriage and means for pressing and for remaining resting against the rear end of the animal in order to be able to place the oblique axes always at the same distance from the rear end of the animal as seen horizontally.

4. Apparatus according to claim 2 wherein the swivelling arms have carrying means for the milking unit which can move the milking unit horizontally approximately in the lengthwise direction of the animal and vertically relative to the action points of the swivelling arms on the carrying means.

5. Apparatus according to claim 4 wherein the milking unit is connected by means of a hinge connection with an approximately horizontal hinge axis to the carrier means and to the swivelling arms for changing the position of the milking unit about the hinge axis relative to a horizontal plane.

6. An apparatus according to claim 1 or 2, further comprising a cleaning unit for the udder and teat of the animal to be milked, said cleaning unit disposed movably in the supporting structure in the space behind the animal to be milked, near the part thereof which accommodates the milking unit in the retracted position, said cleaning unit moved from a retracted position next to the space for the retracted position of the milking unit to a working position near the udder.

7. Apparatus according to claim 6 further comprising second swivelling arms which swing about roughly horizontal axes, said axes forming an oblique angle with the center lengthwise plane, wherein the cleaning unit is suspended from said second swivelling arms.

8. Apparatus according to claim 7 further comprising a carriage which can travel or glide in the fixed structure behind the place of the animal to be milked in the center lengthwise plane thereof, wherein the swivelling arms are disposed so that they swivel about said oblique axes on the carriage, and means for pressing and for remaining resting against the rear end of the animal in order to be able to place the oblique axes always at the same distance from the rear end of the animal as seen horizontally.

9. Apparatus according to claim 8 wherein the carriage has means for laterally confining the flanks of the animal at the rear end, the means being movable to and from the center lengthwise plane of the animal, for adjustment for the width of the animal on the spot, and being held in a position in which they thus confine the animal.

10. Apparatus according to claim 7 wherein the second swivelling arms have carrying means for the cleaning device which can move the cleaning device horizontally approximately in the lengthwise direction of the animal and vertically relative to the action points of the second swivelling arms on the carrying means.

11. Apparatus according to claim 10 wherein the milking unit is connected by means of a hinge connection with an approximately horizontal hinge axis to the carrier means and to the swivelling arms for changing the position of the milking unit about the hinge axis relative to a horizontal plane.

12. Apparatus according to claim 6 wherein the cleaning device comprises a rotating brush with a horizontal axis transverse to the longitudinal direction of the animal to be milked, said brush and its support being movable between the hind legs of the animal.

13. Apparatus according to claim 12 in which the brush is supported by vertically flexible means such as arms with a counterweight to exert a flexible vertical contact pressure on the udder and the teat during cleaning.

14. Apparatus according to claim 12 further comprising supporting and moving means for the brush, said supporting and moving means adapted to move the brush horizontally forwards and backwards below the udder during cleaning.

15. Apparatus according to claim 14 further comprising driving means for rotating the brush, said driving means being reversible so as to drive the brush in different directions of rotation during the forward and backward movements.

16. Apparatus according to claim 15 in which control means automatically cause the brush to rotate with its bristles in contact with the udder forwardly during the forward movement of the brush below the udder and backwardly during the backward movement of the brush below the udder.

17. Apparatus according to claim 1 in which a cleaning device for the teat cups is disposed on the fixed surrounding structure in the region where the milking unit is in a position retracted from the animal.

18. Apparatus according to claim 1 wherein means are provided on the guide means for the milking unit for exerting a constant upward pressure of the milking unit during milking despite height differences and variations of the udder.

19. Apparatus according to claim 1 wherein during at least a part of the horizontal translations, the milking unit and the cleaning unit swivel about a horizontal axis, said swivel being under the control of position-observation devices connected to a processor, said position-observation devices using the position of the hind end of the animal to be milked as a reference, said position-observation devices working in conjunction with identification means for individual animals wherein the position of the udder of each animal follows from a memory, said position of the udder affecting the drive means for the movements of the milking unit and cleaning unit via the position-observation devices.

* * * * *

UNITED STATES PATENT AND TRADEMARK OFFICE
CERTIFICATE OF CORRECTION

PATENT NO. : 4,936,255

DATED : June 26, 1990

INVENTOR(S) : ANNE PERA

It is certified that error appears in the above-identified patent and that said Letters Patent is hereby corrected as shown below:

On the title page, before item [57] ABSTRACT:
In the Attorney, Agent or Firm section, change "Ingersoll Buchanan" to --Buchanan Ingersoll, P.C.--.

Signed and Sealed this

Tenth Day of December, 1991

Attest:

HARRY F. MANBECK, JR.

*Attesting Officer*   *Commissioner of Patents and Trademarks*